(12) United States Patent
Shiraki et al.

(10) Patent No.: US 6,384,633 B1
(45) Date of Patent: May 7, 2002

(54) SEMICONDUCTOR DEVICE

(75) Inventors: Hiroyuki Shiraki; Yusuke Shiozaki, both of Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/812,823

(22) Filed: Mar. 21, 2001

(30) Foreign Application Priority Data

Sep. 28, 2000 (JP) ........................................ 2000-295381

(51) Int. Cl.[7] .......................................... H03K 19/0175
(52) U.S. Cl. .............................. 326/82; 326/86; 326/90
(58) Field of Search ............................. 326/82, 86, 90, 326/105

(56) References Cited

U.S. PATENT DOCUMENTS 5,170,072 A * 12/1992 Ihara ........................... 307/264
6,151,375 A * 11/2000 Nakatsugawa .............. 375/370

FOREIGN PATENT DOCUMENTS

JP          6-332846        12/1994

* cited by examiner

*Primary Examiner*—Michael Tokar
*Assistant Examiner*—Anh Q. Tran
(74) *Attorney, Agent, or Firm*—Staas & Halsey LLP

(57) ABSTRACT

A semiconductor device is provided. The semiconductor device includes a repeater performing buffering operation at some midpoint in a multiplex bus over which an address and data are transmitted by a time division method. The repeater includes a part which transmits only an address when the address does not indicate a data transmission destination which is located ahead of the repeater.

6 Claims, 6 Drawing Sheets

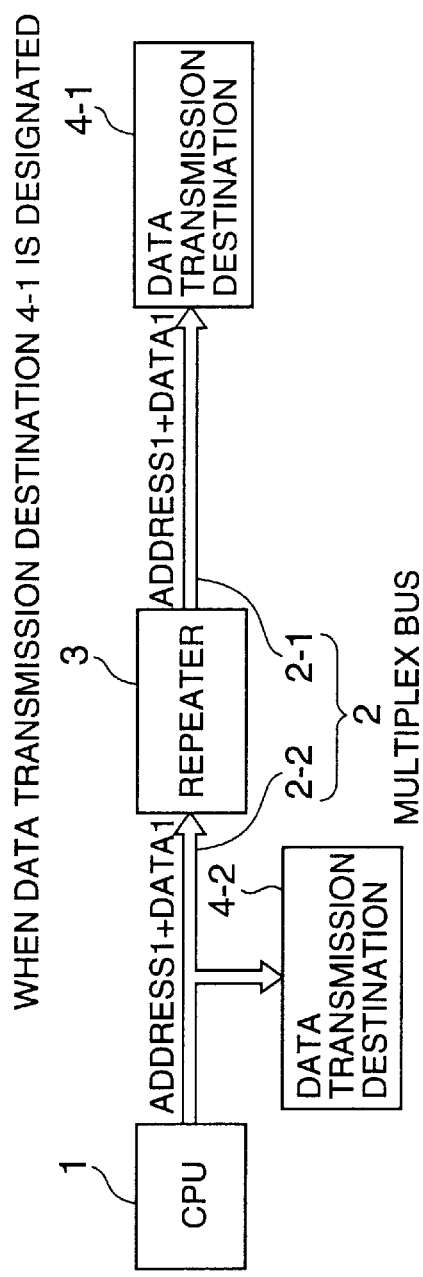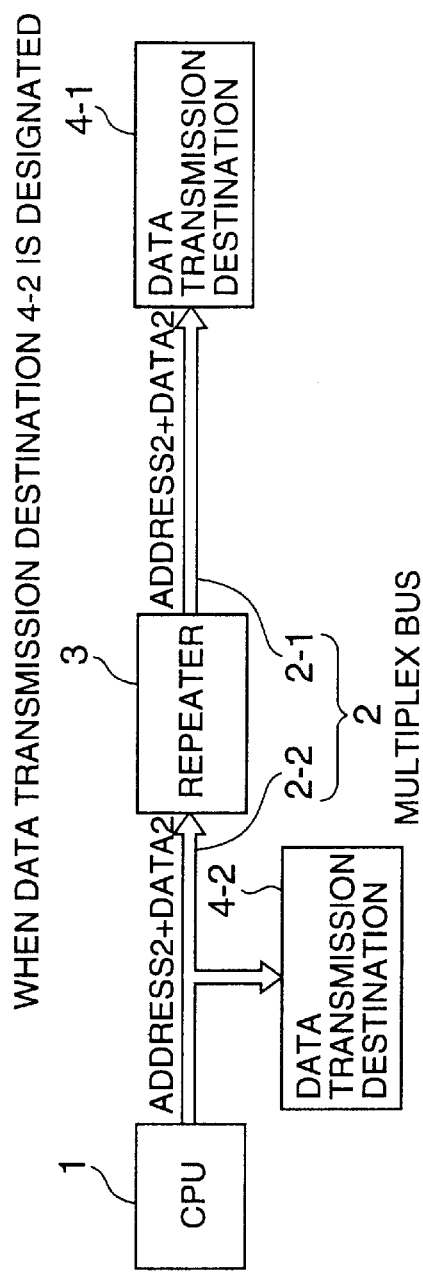
FIG.2A PRIOR ART
FIG.2B PRIOR ART

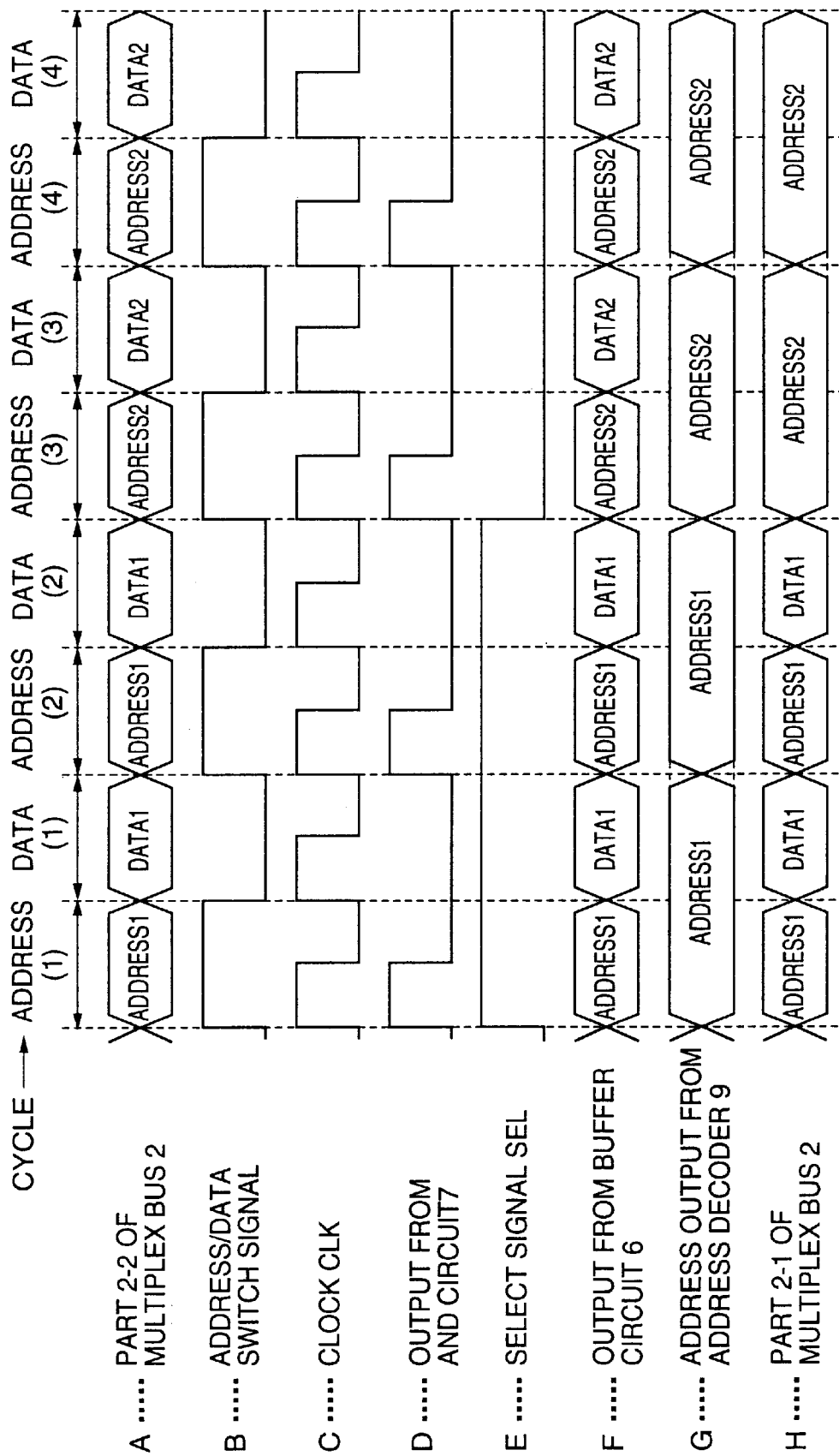

SEMICONDUCTOR DEVICE

BACKGROUND OF THE INVENTION

1. Field of the Invention

The present invention relates to a semiconductor device having a repeater performing buffering operation at some midpoint in a multiplex bus in which an address and data are transmitted by a time division method.

2. Description of the Related Art

FIG. 1 is a circuit diagram showing a part of an example of a conventional semiconductor device. In FIG. 1, 1 indicates a CPU which outputs addresses and data by the time division method, 2 indicates a multiplex bus which transmits the address and data which are output from the CPU 1 by the time division method, 3 indicates a repeater which includes only a buffer circuit which is provided at some midpoint in the multiplex bus 2, 4-1 indicates a data transmission destination among a plurality of data transmission destinations which are connected to a part 2-1 of the multiplex bus 2 which is placed ahead of the repeater 3, 4-2 indicates a data transmission destination among a plurality of data transmission destinations which are connected to a part 2-2 of the multiplex bus 4-2 which is placed before the repeater 3.

FIGS. 2A and 2B show circuit diagrams for explaining the operation of the conventional semiconductor device shown in FIG. 1. When an address ADDRESS 1 which indicates the data transmission destination 4-1 and data DATA 1 to be transmitted to the data transmission destination 4-1 are sent from the CPU 1 by the time division method, the address ADDRESS 1 and the data DATA 1 are sent to the data transmission destination 4-1 through the multiplex bus part 2-2, the repeater 3 and the multiplex bus part 2-1 shown in FIG. 2A.

When an address ADDRESS 2 which indicates the data transmission destination 4-2 and data DATA 2 to be transmitted to the data transmission destination 4-2 are sent from the CPU 1 by the time-division method, the address ADDRESS 2 and the data DATA 2 are sent to the data transmission destination 4-2 through the multiplex bus part 2-2. Then, in this case, since the repeater 3 is configured only by the buffer circuit, the address ADDRESS 2 and the data DATA 2 are also sent to the multiplex bus part 2-1 as shown in FIG. 2B.

As mentioned above, according to the conventional semiconductor device shown in FIG. 1, even when the address indicating the data transmission destination which is connected to the multiplexed bus part 2-2 which is before the repeater 3 and the data are output from the CPU 1, the repeater 3 transmits the address and the data to the multiplex bus part 2-1 by the time division method. Thus, there is a problem in that the repeater performs unnecessary operation that it changes logic values on the part 2-1 from an address value to a data value. Therefore, power is consumed uselessly.

SUMMARY OF THE INVENTION

It is an object of the present invention to provide a semiconductor device which can decrease power consumed when an address does not indicate a data transmission destination which is placed ahead of the repeater.

The above object is achieved by a semiconductor device having a repeater performing buffering operation at some midpoint in a multiplex bus over which an address and data are transmitted by a time division method, the repeater including:

a part which transmits only an address when the address does not indicate a data transmission destination which is located ahead of the repeater.

According to the present invention, when the address does not indicate the data transmission destination which is placed ahead of the repeater, the repeater transmits only the address. Thus, the operation in which the logic values on the multiplex bus which is located ahead of the repeater are changed from an address value to a data value is not performed. Thus, power conventionally consumed can be decreased in the present invention.

BRIEF DESCRIPTION OF THE DRAWINGS

Other objects, features and advantages of the present invention will become more apparent from the following detailed description when read in conjunction with the accompanying drawings, in which:

FIGS. 2A and 2B are circuit diagrams for explaining the operation of the conventional semiconductor device shown in FIG. 1;

FIG. 5 is a timing chart for explaining the operation of the embodiment of the present invention;

DETAILED DESCRIPTION OF THE PREFERRED EMBODIMENTS

Figure 1:
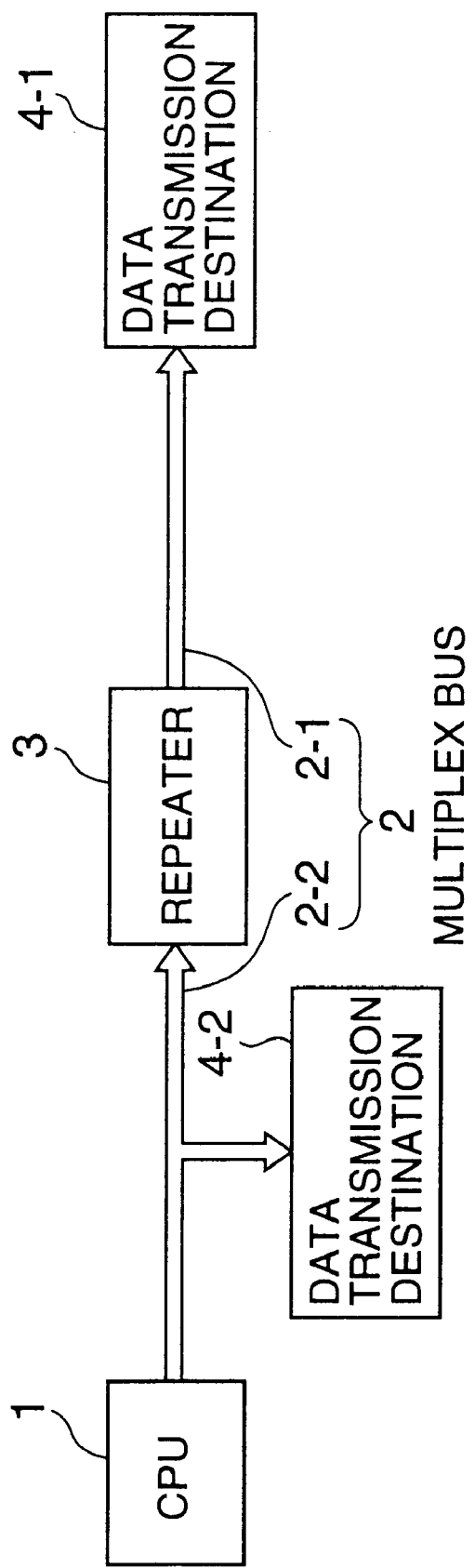
FIG. 1 is a circuit diagram showing a part of an example of a conventional semiconductor device.
Figure 3:
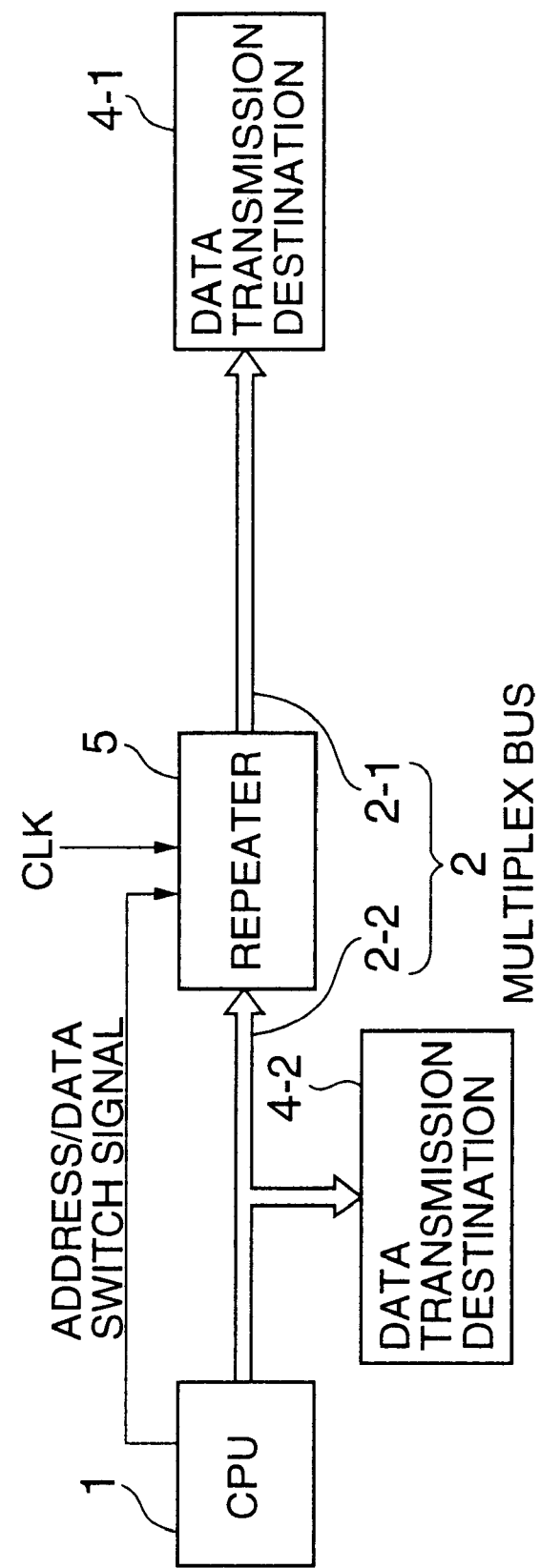
FIG. 3 is a circuit diagram showing a part of an embodiment of the present invention.

FIG. 3 is a circuit diagram showing a part of an embodiment of the present invention. In the embodiment of the present invention, a repeater 5 is provided, and the CPU 1 applies an address/data switch signal to the repeater 5. The circuit configuration of the repeater 5 is different from that of the repeater 3 which is provided in the conventional semiconductor device shown in FIG. 1 and has only the buffer circuit. The other parts of the circuit of this embodiment is the same as the conventional semiconductor device shown in FIG. 1.

Figure 4:
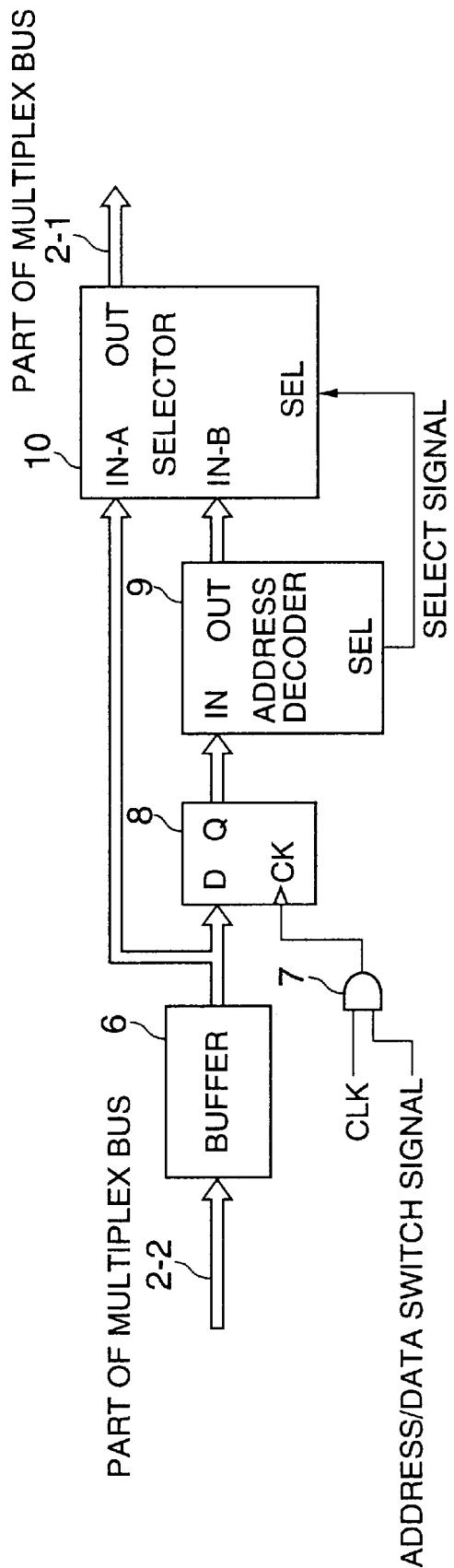
FIG. 4 is a circuit diagram showing the configuration of a repeater provided in the embodiment of the present invention.

FIG. 4 is a circuit diagram showing the configuration of the repeater 5. In FIG. 4, 6 indicates a buffer circuit which performs buffering of an address and data which are transmitted by the time division method on the multiplex bus part 2-2, 7 indicates an AND circuit which performs AND operation between a clock signal CLK and the address/data switch signal, 8 indicates a D flip-flop circuit which latches the address in the address and data output from the buffer circuit 6. The D flip-flop circuit 8 is configured such that an output from the buffer circuit 6 is applied to a data input terminal group D and an output from the AND circuit 7 is applied to the clock input terminal CK.

In addition, 9 indicates an address decoder. The address output from a positive phase output terminal group Q of the D flip-flop circuit 8 is applied to the address decoder 9, and the address decoder 9 outputs the applied address to an output terminal group OUT, decodes the applied address and outputs the decoded address as a select signal SEL. The select signal SEL is set at H level when the applied address indicates the data transmission destination (for example, the data transmission destination 4-1) connected to the multiplex bus part 2-1 which is ahead of the repeater 5. When the applied address indicates the data transmission destination (for example, the data transmission destination 4-2) connected to the multiplex bus part 2-2 which is before the repeater 5, the select signal SEL is set at L level.

10 indicates a selector. The output from the buffer circuit 6 is applied to an input terminal group IN-A for a signal to be selected of the selector 10, and the address output from the address decoder 9 is applied to another input terminal group IN-B for a signal to be selected of the selector 10. When the select signal SEL is at H level, the selector 10 selects the output from the buffer 6 applied to the input terminal group IN-A. When the select signal SEL is at L level, the output from the address decoder 9 applied to the input terminal group IN-B is selected.

FIG. 5 is a timing chart for explaining the operation of the embodiment of the present invention. As shown in A of FIG. 5, CPU 1 outputs, to the multiplex bus part 2-2, ADDRESS 1 (an address indicating the data transmission destination 4-1), DATA 1 (data to be sent to the data transmission destination 4-1), ADDRESS 1, DATA 1, ADDRESS 2 (an address indicating the data transmission destination 4-2), DATA 2 (data to be sent to the data transmission destination 4-2), ADDRESS 2 and DATA 2 in this order. In this case, the output data of the buffer circuit 6 is shown in F of FIG. 5. In FIG. 5, ADDRESS (i) indicates an ith address cycle period, and DATA (i) indicates an ith data cycle period.

As shown in B of FIG. 5, the address/data switch signal is set at H level during periods when an address is output from the CPU 1 (address cycle period), and the address/data switch signal is set at L level during periods when data is output from the CPU 1 (data cycle period). As shown in C of FIG. 3, the clock signal CLK is set at H level in the first half of the address cycle period and in the first half of the data cycle period, and the clock signal CLK is set at L level in the latter half of the address cycle period and in the latter half of the data cycle period.

As a result, as shown in D of FIG. 5, the output of the AND circuit 7 is at H level in the first half of the address cycle period, and is at L level in the latter half of the address cycle period and in the data cycle period. As shown in G of FIG. 5, the address output from the positive phase output terminal group Q of the D flip-flop circuit 8, that is, the address output from the output terminal group OUT of the address decoder 9 is ADDRESS 1 in the first address cycle period, in the first data cycle period, in the second address cycle period and in the second data cycle period, and is ADDRESS 2 in the third address cycle period, in the third data cycle period, in the fourth address cycle period and in the fourth data cycle period.

As shown in E of FIG. 5, the select signal SEL is at H level during a period when ADDRESS 1 is output from the address decoder 9 and is at L level during a period when ADDRESS 2 is output from the address decoder 9. Therefore, the output from the selector 10, that is, the signal on the multiplex bus part 2-1 becomes ADDRESS 1 in the first address cycle period, DATA 1 in the first data cycle period, ADDRESS 1 in the second address cycle period, DATA 1 in the second data cycle period, and ADDRESS 2 in the third address cycle period, in the third data cycle period, in the fourth address cycle period and in the fourth data cycle period.

Figure 6A:
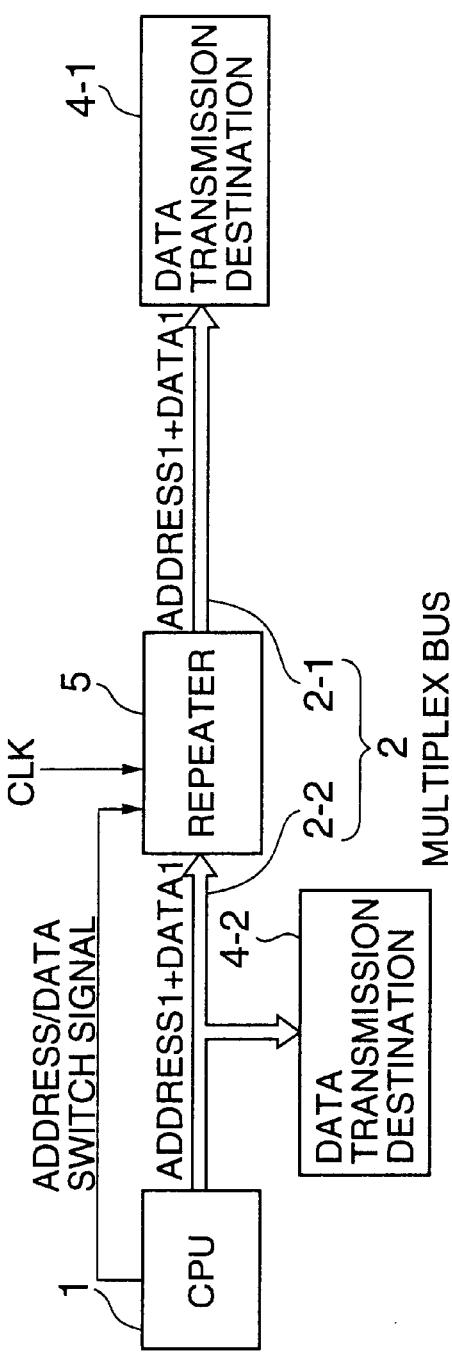
FIGS. 6A and 6B are circuit diagrams for explaining the operation of the embodiment of the present invention.

Accordingly, in the embodiment of the present invention, as shown in FIG. 6A, when the address ADDRESS 1 indicating the data transmission destination 4-1 and the data DATA 1 to be sent to the data transmission destination 4-1 are output from the CPU 1 by the time division method, the address ADDRESS 1 and the data DATA 1 are transmitted to the data transmission destination 4-1 via the multiplex bus part 2-2, the repeater 5 and the multiplex bus part 2-1.

Figure 6B:
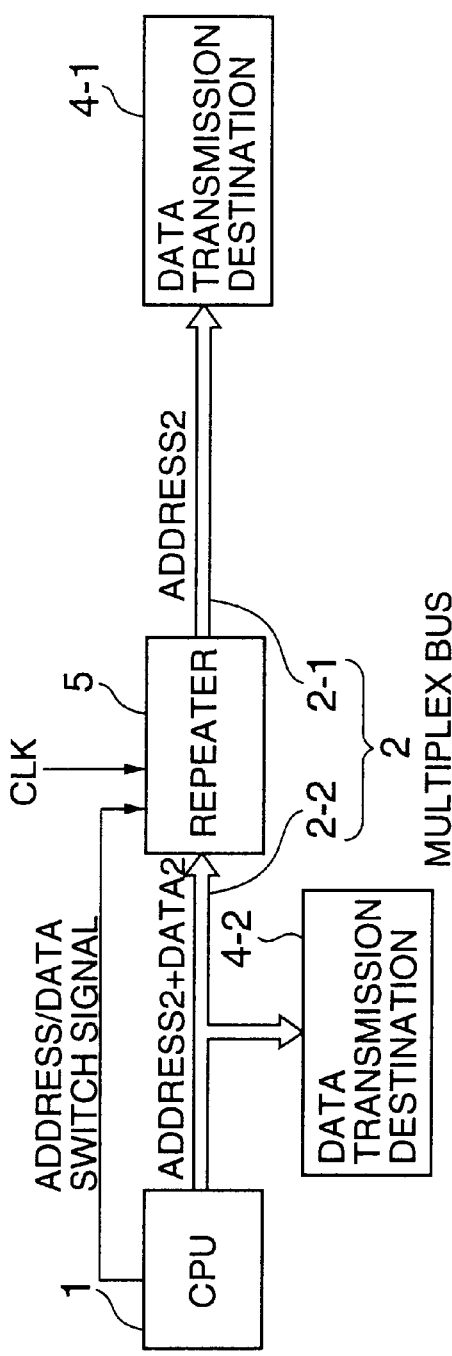

In addition, as shown in FIG. 6B, when the address ADDRESS 2 indicating the data transmission destination 4-2 and the data DATA 2 to be sent to the data transmission destination 4-2 are output from the CPU 1 by the time division method, the address ADDRESS 2 and the data DATA 2 are transmitted to the data transmission destination 4-2 via the multiplex bus part 2-2. In this case, as shown in FIG. 6B, the address ADDRESS 2 is transmitted over the multiplex bus part 2-1, however, the data DATA 2 is not transmitted over the part 2-1.

That is, in the embodiment of the present invention, when an address indicating a data transmission destination connected to the multiplex bus part 2-1 which is placed ahead of the repeater 5 and data are output from the CPU 1 by the time division method, the address and the data are transmitted to the designated data transmission destination through the multiplex bus part 2-2, the repeater 5 and the multiplex bus part 2-1.

In addition, when an address indicating a data transmission destination connected to the multiplex bus part 2-2 which is before the repeater 5 and data are output from the CPU 1 by the time division method, the address and the data are transmitted to the designated data transmission destination through the multiplex bus part 2-2. In this case, the address is transmitted over the multiplex bus part 2-1, however, the data is not transmitted to the part 2-1.

Thus, according to the embodiment of the present invention, when an address output from the CPU 1 does not indicate the part 2-1 which is ahead of the repeater 5, the repeater 5 transmits only the address to the part 2-1. Therefore, the operation of changing a logic value on the part 2-1 ahead of the repeater 5 from an address value to a data value is not performed. As a result, power consumption can be decreased.

As mentioned above, according to the present invention, when the address does not indicate the data transmission destination which is ahead of the repeater, the repeater transmits only the address. Thus, the operation of changing the logic value on the multiplex bus part which exists ahead of the repeater from an address value to a data value is not performed. As a result, power consumption can be decreased.

The present invention is not limited to the specifically disclosed embodiments, and variations and modifications may be made without departing from the scope of the invention.

What is claimed is:

1. A semiconductor device having a repeater performing buffering operation at some midpoint in a multiplex bus over which an address and data are transmitted by a time division method, said repeater comprising:
   a part which transmits only said address when said address does not indicate a data transmission destination which is located ahead of said repeater.

2. The semiconductor device as claimed in claim 1, said part comprising:
   an address decoder which decodes said address, and outputs said address and a signal determined by said address; and
   a selector which receives said address and said signal, and outputs said address according to said signal.

3. The semiconductor device as claimed in claim 2, wherein said address decoder determines a level of said signal according to a data transmission destination indicated by said address.

4. A semiconductor device having a repeater performing buffering operation at some midpoint in a multiplex bus over which an address and data are transmitted by a time division method, said repeater comprising:

a buffer which outputs said address and said data;

an address decoder which decodes said address, and outputs said address and a signal determined by said address; and a selector which receives output data from said buffer, said address and said signal from said address decoder, and selects from among said output data and said address according to said signal.

5. The semiconductor device as claimed in claim 4, wherein said address decoder sets said signal at a level when said address does not indicate a data transmission destination which is located ahead of said repeater, and said selector selects said address output from said address decoder from among said output data and said address when said signal is set at said level.

6. The semiconductor device as claimed in claim 4, said repeater further comprising:

a latch which receives said output data from said buffer, latches said address and outputs said address to said address decoder.

* * * * *